(12) United States Patent
Henwood (10) Patent No.: US 10,495,229 B2
(45) Date of Patent: Dec. 3, 2019

(54) SEVERE SERVICE VALVE

(71) Applicant: Gerard S. Henwood, Berea, OH (US)

(72) Inventor: Gerard S. Henwood, Berea, OH (US)

( * ) Notice: Subject to any disclaimer, the term of this patent is extended or adjusted under 35 U.S.C. 154(b) by 0 days.

(21) Appl. No.: 15/894,029

(22) Filed: Feb. 12, 2018

(65) Prior Publication Data

US 2018/0172165 A1    Jun. 21, 2018

Related U.S. Application Data

(62) Division of application No. 14/746,978, filed on Jun. 23, 2015, now Pat. No. 9,909,672.

(51) Int. Cl.
*F16K 5/06* (2006.01)
*F16K 43/00* (2006.01)
*F16K 27/06* (2006.01)

(52) U.S. Cl.
CPC .............. *F16K 5/0657* (2013.01); *F16K 5/06* (2013.01); *F16K 27/067* (2013.01); *F16K 43/001* (2013.01); *F16K 43/003* (2013.01)

(58) Field of Classification Search
CPC .... F16K 43/003; F16K 27/067; F16K 43/001; F16K 5/06; F16K 3/34; F16K 5/12; Y10T 137/6035; Y10T 137/6041; Y10T 137/6045

USPC ............ 251/205, 206, 207; 137/613, 315.18, 137/315.2, 215.21

See application file for complete search history.

(56) References Cited

U.S. PATENT DOCUMENTS

| | | | | |
|---|---|---|---|---|
| 1,017,292 A | * | 2/1912 | Hyde | F16K 5/0605 251/207 |
| 2,101,356 A | * | 12/1937 | Zak | F16K 5/10 251/207 |
| 2,621,012 A | * | 12/1952 | Graham | F16K 39/06 138/45 |
| 3,558,100 A | * | 1/1971 | Hulsey | F16K 5/0435 251/207 |
| 5,009,393 A | * | 4/1991 | Massey | F16K 5/0214 137/625.3 |
| 5,562,116 A | | 10/1996 | Henwood | |
| 5,941,266 A | | 8/1999 | Henwood | |
| 6,488,261 B1 | | 12/2002 | Lee | |
| 8,453,676 B2 | | 6/2013 | Smith et al. | |
| 2010/0140522 A1 | | 6/2010 | Chang et al. | |
| 2012/0216894 A1 | | 8/2012 | Lomax | |

* cited by examiner

*Primary Examiner* — Michael R Reid (74) *Attorney, Agent, or Firm* — Pearne & Gordon LLP (57) ABSTRACT

Severe service industrial valves having at least one valve ball and seat that can be repaired or replaced while the valve remains connected in-line with inlet and outlet pipe lines.

2 Claims, 6 Drawing Sheets

SEVERE SERVICE VALVE

This application is a division of application Ser. No. 14/746,978, filed Jun. 23, 2015.

BACKGROUND OF THE INVENTION

The invention relates to in-line repairable industrial ball valves for severe service applications.

PRIOR ART

Power plants, prior to deregulation, were operated in a way where they would run for long durations, usually for weeks or months at a time. Now, plants, with the exception of nuclear plants, are no longer "base-loaded". They cycle up and down frequently, oftentimes, daily. Newer gas and steam turbine designs are capable of quick-starts to meet this new power generation operating environment. This frequent cycling of power generation assets places great demands on the equipment. There is much greater wear and tear on the system. Valves are cycled more frequently in this operating environment. Valves can take the brunt of cycling wear and tear. They leak more frequently than they did in the past. This leakage reduces plant operating efficiency and leads to more fuel being burned to create electric power.

Advances in metal coating technology enabled valve manufactures to move towards ball valve designs for severe service applications in the later part of the last century. Previously manufacturers were limited to making ball valves for operating temperatures below 500 degrees Fahrenheit, using materials like Teflon® for the ball seals or seats. Ball valves typically have a metal ball with a hole through it. When the hole is aligned with the axis of the connecting pipe the valve is in the open flowing position. When turned 90 degrees (¼ turn), it is closed and no flow occurs. Valve makers and users relied on the lubricity that Teflon offered for ease of operation and excellent sealing. The use of high velocity oxy-fueled sprayed-on coatings and other metal treatments along with specialized lapping technology created exceedingly hard and very smooth surfaces for ball valve balls, seat seals and ball guides. These smooth and hard surfaces opened the door for ball valves to be used in very demanding applications, like those found in power generation, chemical processing, oil refining and paper making industries, where very high pressure and temperature presents erosive and corrosive effects that can destroy flow control devices very quickly, especially during a start-up or shut-down.

Boilers have to eliminate contaminants in their water to keep them from coating the tubes that are exposed to the heating fire. Such coating can reduce the transfer of heat to the water and decrease the thermal efficiency of a boiler. Blowing a boiler down, along with specialized water treatment regimens, is a conventional way of keeping the boiler water clean. Historically, boiler blow down was considered such a severe wear and tear application that two tandem valves are required by the American Society of Mechanical Engineers. One valve is considered a sealing valve and the other a blowing valve. Plant operators relied on the sealing valve for complete shut-off. The frequency of blowdowns, typically daily, increases wear and tear. In the age of cycling power plants it can be said that all valves operate like blow-down valves. Hence, there is common use of double valves in steam service shut-off. The most common service for these valves are small diameter, usually two inch and smaller, pipe size vents and drains.

Metal seated ball valves (MSBVs) have gained wide acceptance in severe service because their unique shut-off characteristics lead to better shut-off than gate or globe valves. First among these characteristics is that supply or system pressure is used to push the ball into the seat. Globe valves typically have flow coming up underneath a sealing plug constantly pushing the plug away from the shut-off seal. A second characteristic is that the shut-off sealing surface of a ball valve is protected from erosive forces as it does not see flow in the full-open position. The ball hole (port) blocks flow from the seat. The next characteristic making a MSBV superior to a globe valve is the wiping action that occurs across the seat during operation. This cleans the ball and seat of any foreign material that may otherwise get lodged preventing tight shut-off and increasing erosive wear and tear that occurs when a shut-off element is very close to the seating surface, but not all the way against it. Another characteristic is that only a ¼ turn of the operating shaft (stem) is needed to go from full closed to full open and vice versa. This simplifies operation in manual valves and in most power operated valves. It also provides valve position (open or closed) indication. When the lever handle is parallel to the pipe it is open and closed when perpendicular to the pipe. A quarter turn stem virtually eliminates leaks at the valve stem seal. Quarter turn means that there is not much movement of the shaft that wears out the stem packing seal. It also is a rotating movement, not an up and down shaft (linear) movement so all seal materials (typically compressed graphite ribbon) stays within the stem seal compartment (stuffing box). In addition to the better shut-off characteristics, ball valves don't require large top-works to accommodate a threaded valve stem. Ball valves are more compact than gate or globe valves. Ball valves have much greater flow capacity than globe valves. This allows the introduction of turns in the flowpath without unduly compromising flow capacity.

Common MSBVs are best assembled from the side of the valve, rather than the top. The design is referred to as split body or end-entry. Most severe service valves are welded in the pipe to prevent leakage at the pipe connection. This means that they cannot be serviced when they are in the pipe. Some manufacturers have overcome this challenge with top-entry designs. These designs have proven to be effective, but, they are typically larger valves, and therefore more costly to manufacture.

The valves of U.S. Pat. No. 5,941,266 provide a means to easily withdraw all internal valve parts without disturbing the piping. This is accomplished by turning the flowpath away from the pipe to dispose a flow axis where parts can be removed and re-installed. The internal valve component, sometimes called the "cover", presents both a valve seat and a flow turning element. This design works well in horizontal and vertical upflowing (vents in a power plant) pipe. Difficulty comes about with downflowing (drain service in power plants) as reassembly of the ball is awkward as it has to be pushed up into the valve.

The use of double ball valves is common in industry, but they are not typically considered in-line repairable. They are generally one valve body with their internals stacked together and connected to the pipe by bolted flanges. They commonly have a third intermediate valve for bleeding the pressure between the two valves. They are called double block and bleed valves.

SUMMARY OF THE INVENTION

The valves of the invention solve the in-line reassembly challenge by turning the flow at the valve entry point ninety degrees and then flowing straight out of the cover which turns the flow another ninety degrees. This introduces two turns to the flow and provides a horizontal plane for easier valve repairs. MSBVs, having a greater flow coefficient than same size globe valves, can permit the flow capacity loss from the two turns without unduly compromising overall flow performance expected in an end-of-line service such as power plant vent, drain and equipment isolation. The inventive disclosed valves will offset the pipe due to their internal turns. The inventive disclosed valves can be used in horizontal pipe as well as the vertical (downflowing) pipe which they are primarily designed for.

The invention with two covers for sealing and flow-turning, and connecting from one valve to another valve inside one body, rather than to the connecting pipe, brings another level of shut-off capability to severe service end of line and equipment isolation service. It is very important for valves that are end-of line to hold tight as they usually leak to atmosphere which is wasteful and they are required to hold tight if a plant needs to service equipment while the unit is in service and pressurized. A leak in equipment isolation service can harm plant maintenance personnel.

The invention, by having two valves in one body, offers a cost reduction in manufacturing and in installation. With ball valves being more compact than globe and gate valves this doubling up of valves affords a good value for plant operators and ultimately consumers of the plant's output. In the case of power generation, the invention can help keep electric bills down.

In addition to arrangements having two of the same ball valve designs in one body, the severe service valve of the invention also includes the use of a ball valve and a globe style valve and, alternatively, a ball valve with a multiple orifice ball valve. Globe valves and orifice ball valves are better for throttling service. Using a ball valve as a sealing valve and a globe valve for blowing service in a boiler blow-down service has advantages using the best merits of each valve design in one compact and inline repairable valve design. This design can be used for intermittent and continuous blowdown service. Continuous blowdown is done in the boiler steam drum to remove impurities near the top of the water while intermittent blowdown is done at the bottom of the boiler. The multiple orifice ball lends itself to the metered flow found in continuous blowdown. The ball valve is side entry and the globe valve is top entry typically into a rectangular block body without need for welding and welding related heat treatment and non-destructive testing.

The valves of this invention counter the costly effects of wear and tear by providing advanced sealing capability and unprecedented ease of rebuilding. Rather than having a valve leaking until it can be replaced during a scheduled plant shutdown it can now be fixed in about one hour at any point the plant is offline.

DESCRIPTION OF THE PREFERRED EMBODIMENTS

Figure 1:
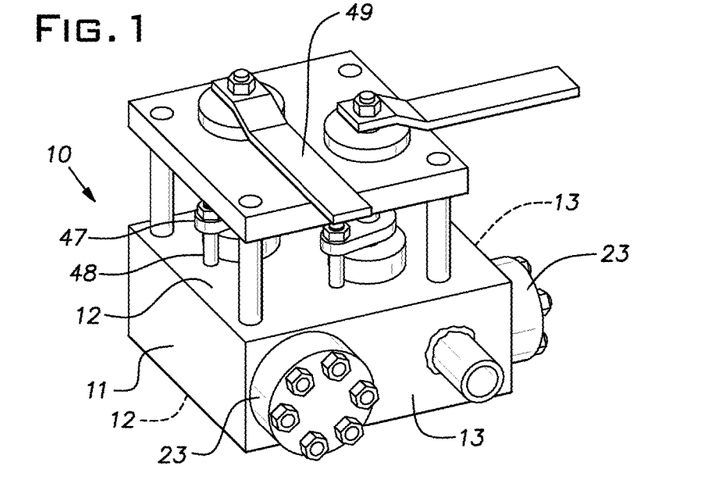
FIG. 1 is a perspective view of a valve according to a first embodiment of the invention.
Figure 2:
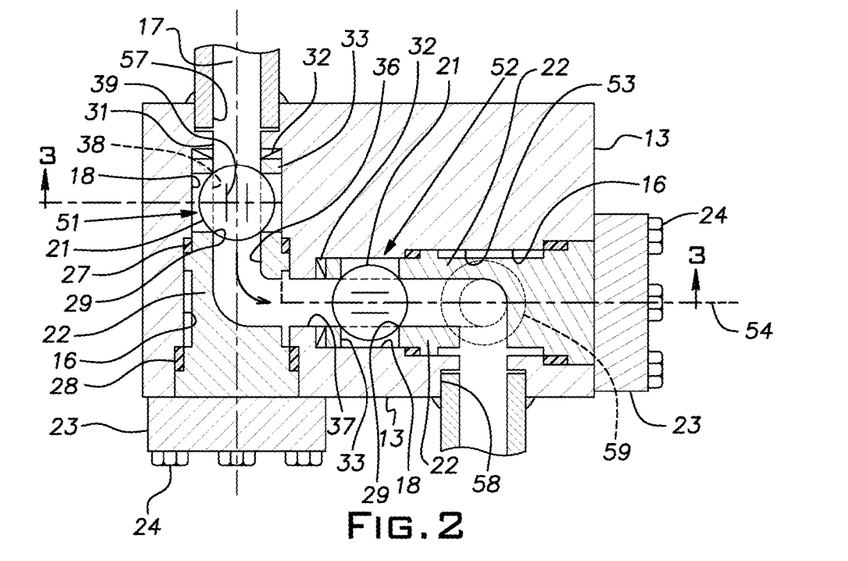
FIG. 2 is a schematic cross-sectional view of the valve of FIG. 1.
Figure 3:
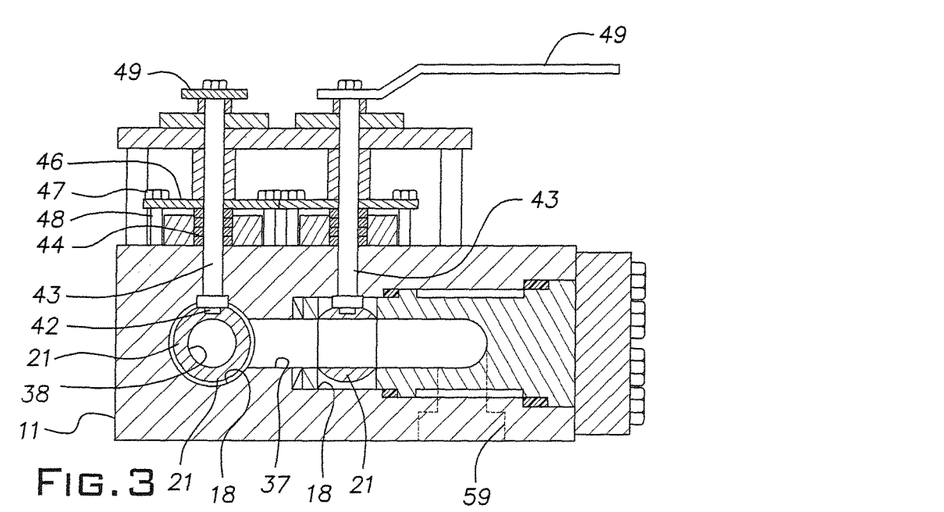
FIG. 3 is a cross-sectional view of the valve of FIG. 2 taken along the staggered cross-sectional line 3-3 in FIG. 2.

Referring to FIGS. 1-3, there is illustrated an in-line repairable tandem ball valve 10 having a unitary body 11. The body or housing 11 can be machined from suitable steel such as carbon steel, chrome moly steel or stainless steel. Stock for the body can be cut from heavy steel plate or bar of a suitable thickness into a rectangular parallelepiped or other flat-sided form. In the illustrated arrangement, the body 11 has parallel major faces 12 and perpendicular minor faces 13.

The body 11 is machined with a first circular bore 16 with an axis 17 parallel to the major faces 12. The bore 16 is open at the face 13 and extends inwardly to form a valve ball receiving cavity 18 distal from its opening. A valve ball 21 is assembled in the cavity 18 concentrically with the axis 17. A downstream valve component (sometimes referred to as a DVC) 22 is a circular element proportioned to be received in the bore 16.

At an outer end of the DVC there is an enlarged circular cover 23. Alternatively, the cover 23 may be integral with the DVC. The cover 23 is retained on the body 11 and the DVC is retained in the bore 16 by a plurality of fasteners or bolts 24 threaded into the body 11. Axial fluid leakage over the exterior of the DVC is prevented by a "behind the seat seal" 27 and a "cover seal" 28. An inner end of the DVC carries a valve seat 29 which, in the illustrated case, is integral with the DVC. Alternatively, the seat 29 may be a separate annular element inserted in or otherwise carried on an end face of the DVC 22. An inner end of the bore 16 is determined by an end wall 31. A spring washer 32 is seated against the wall 31. An annular ball guide is disposed between the spring washer 32 and the valve ball 21. The DVC 22 is proportioned in relation to the other internal components so that when the fasteners 24 are tightened, the cover 23 abuts the associated face 13 of the body 11, the valve ball 21 is tightly pressed against the seat 29 by the spring 32.

The DVC 22 has an internal passage 36, typically of circular cross-section, concentric with the axis 17 in the distal end of the DVC. At a mid-section of the DVC, the passage 36 has a radial orientation relative to the axis 17 forming a side port. The radial part of the passage or side port 36 is aligned and communicates with a circular bore 37 in the body 11 that intersects the bore 16.

The valve ball 21 has a central through bore 38. At one side, the valve ball 21 has a slot 39 that receives an acicular end 42 of a stem 43 so when assembled that the stem is rotationally interlocked with the valve ball 21. The stem 43 is sealed against fluid leakage by packing 44 compressed by a plate 46 when nuts 47 are tightened on studs 48 threaded into the body 11. A handle 49 operated manually or by a power device rotates the valve ball 21 one-quarter turn between open and closed positions.

The valve ball 21, seat 29, and immediately surrounding structure form a first valve 51 of the tandem valve assembly 10. A second valve 52 resides in a second circular bore 53 in the body 11 extending along an axis 54 that intersects the axis 17 of the first valve preferably at a right angle. The bore or passage 37 in the body 11 serves both as an outlet of the first valve 51 and an inlet for the second valve 52.

The illustrated valve assembly 10 uses internal valve elements in the second valve 51 that are the same as used in the first valve 51. It will be understood that this duplication affords multiple economies but that different parts can be substituted as desired or necessary.

The same numerals are used to identify parts of the second valve 52 that correspond with those of the first valve 51. The first described valve 51 is upstream of the second valve 52 and the valves can be described as in series or in tandem relation. A shallow bore 57 forms an inlet for the valve assembly 10 and a similar shallow bore 58 forms an outlet for the valve assembly 10. The side port of the second valve DVC 22 communicates with the outlet 54. The bores 57, 58 are configured to receive the ends of pipe and enable the pipe to be welded to the body 11 with reliable fluid tight joints, sometimes referred to as a socket weld joint. An alternative outlet of the second valve 52 is shown in phantom at 59.

The disclosed tandem ball valve assembly 10 significantly reduces installation time in situations where an application requires a double valve. Only two pipe connections need be made, unlike the situation where two separate valves are used. There is no risk of a leak existing between the valves 51, 52 of the assembly. Further, there is significant savings in the space taken up by the disclosed valve 10 as compared to an installation using two separate valves.

One or both of the valves 51, 52 can be repaired while the body 10 remains welded in the pipe circuitry at the inlets and outlets 57, 58. Removal of the cover 23 and DVC 22 gives ready access to the valve seat 29, valve ball 21, ball guide 33 and spring 32. The ball 21 and seat 29 can be refurbished or replaced as desired or needed. Similarly, the guide 33 and spring 32 can be replaced when needed. Advantageously, these refurbished or replaced parts can be reassembled in the body 11 while the body remains welded in the piping circuit. In line restoration of the valve assembly 10 greatly simplifies and expedites the process when compared to a situation where a valve must first be cut out of a pipe system for internal access to a valve and then be rewelded in place after repair.

Figure 4:
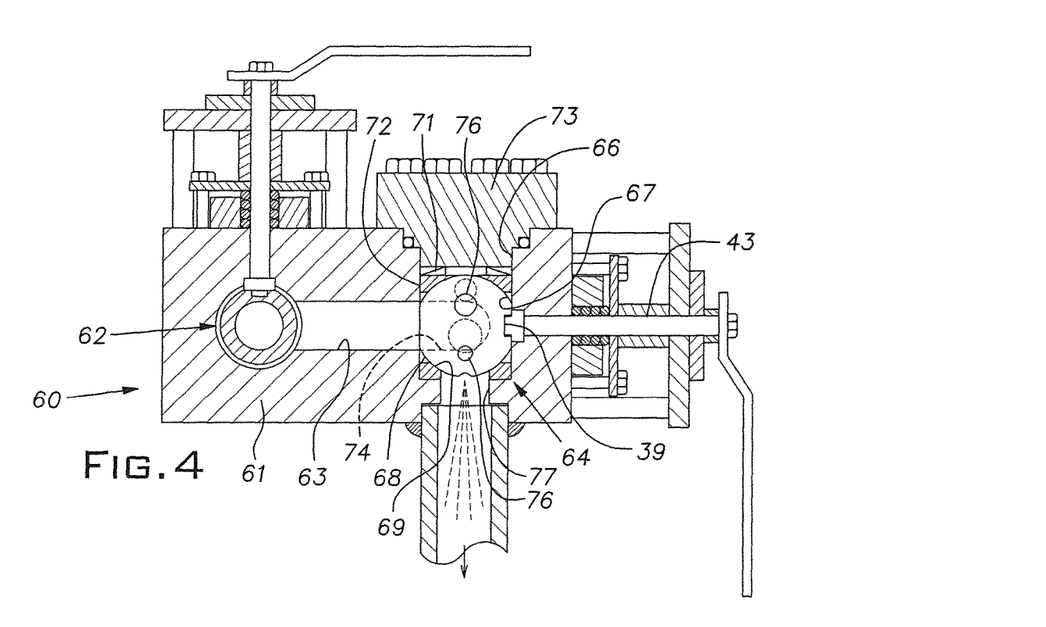
FIG. 4 is a schematic cross-sectional view of a second embodiment of a tandem valve of the invention.

Referring to FIG. 4, there is shown a tandem valve assembly 60 including a one-piece housing or body 61. A first valve 62 of the assembly 60 is the same in construction as the first ball valve 51 described in connection with FIGS. 1-3. An internal passage 63 in the body 61, corresponding to the passage or bore 37 of FIGS. 2 and 3, connects the side port of the DVC of the first valve 51 to a second ball valve 64 which can serve as a blow down valve.

In this second and in further embodiments disclosed hereinbelow, identical parts are identified with identical numerals.

The second valve 64 includes a circular bore 66 forming a cavity 67 in which a multiple orifice valve ball 68 is assembled. The ball 68 is pressed against a seat 69 at an end of the bore 66 by a spring washer 71 acting through an annular guide 72. A cover 73 bolted to the housing 61 closes the bore 66 and compresses the spring 71. The ball 68 has a large central hole 74 communicating with the housing passage 63. A plurality of orifices 76 of different sizes are each connected to the central hole 74 along respective radial lines. The ball 68 is rotated to align a desired orifice 76 with the seat 69 by rotating a stem 43 keyed into a slot or recess 39 in the ball 68. The rate of flow through a valve outlet 77 is regulated by the size of the orifice 76 aligned with the seat 69. It is evident from FIG. 4 that the valve ball 68, seat 69, spring washer 71 and annular guide 72 can be removed for inspection, repair or replacement when the cover 73 is removed. The valve assembly 60 is particularly suited for use in blow down applications where close control of flow rate through the valve assembly 60 is important.

Figure 5:
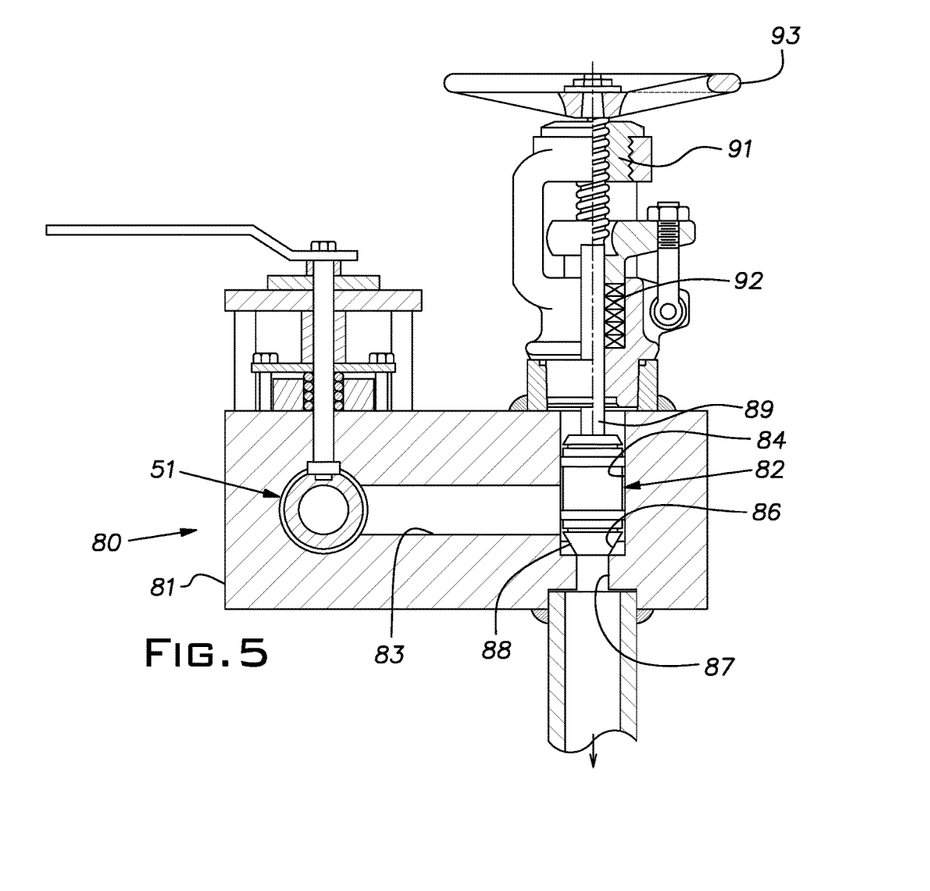
FIG. 5 is a schematic cross-sectional view of a third embodiment of the invention.

FIG. 5 illustrates a tandem valve assembly 80 housed in a body 81. The upstream valve corresponds to the first described valve 51. The valve 51 communicates with a downstream globe type valve 82 through an internal passage 83 corresponding to the passage 37 of the valve assembly 10. The globe type valve 82 includes a circular bore 84 in the body 81 and a valve seat 86 disposed at an end of the bore communicating with a valve outlet 87 of the socket weld type. A circular seat plug 88, preferably having a conical end complimentary to a conical surface of the seat 86 is carried on a stem 89 that extends out of the body 81. An outer end of the stem 89 is assembled in threads of a nut or support 91. The stem 89 is sealed against leakage by packing 92. The axial position of the plug 88 relative to the seat 86 is controlled by rotation of a hand wheel 93 that turns the stem threads in the nut 91. The valve assembly 80 is particularly suited for use in blow down applications where close control of the flow rate through the valve assembly is important.

Figure 6:
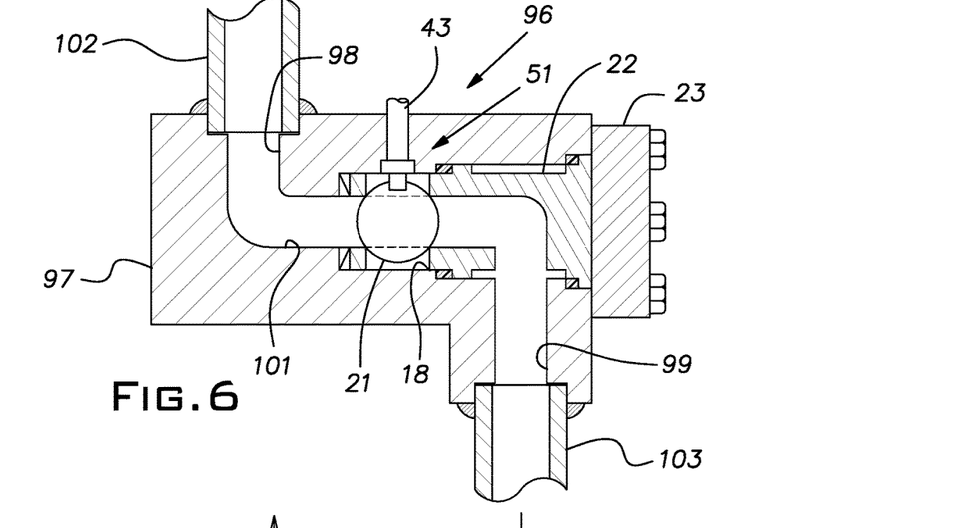
FIG. 6 is a schematic cross-sectional view of a fourth embodiment of the invention.

FIG. 6 illustrates a down flowing or left to right flowing offset valve assembly 96. The valve 96 includes a housing or body 97 in the form of a one-piece or monolithic block. The body has an inlet 98 and outlet 99 preferably configured to receive respective pipe ends for a socket weld connection. An internal passage 101 connects the inlet 98 to a ball valve assembly which can take the form of the first valve 51 disclosed in connection with FIGS. 1-3. The internal passage 101 has a right angle configuration that joins the inlet 98 to the upstream end of the ball receiving cavity 18. The valve assembly 96 is configured so that when it is installed in a piping layout with pipes running vertically, the bore 16 is horizontal to facilitate disassembly and reassembly of the valve internal parts for their repair or replacement. Vertically oriented pipes 102, 103 are shown socket welded to the inlet 98 and outlet 99, respectively.

Figure 7:
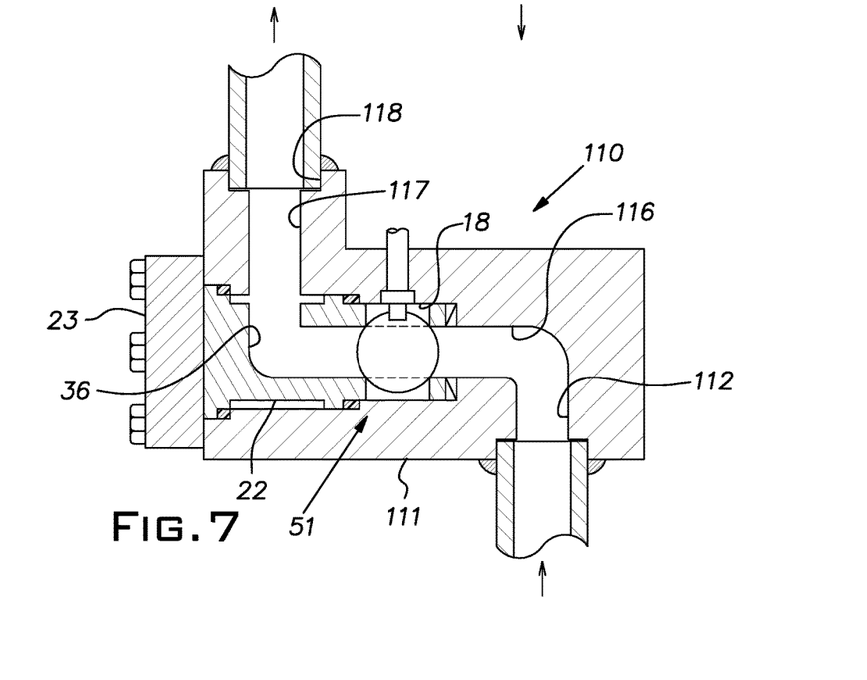
FIG. 7 is a schematic cross-sectional view of a fifth embodiment of the invention.

FIG. 7 illustrates an upflowing or right-to-left offset valve assembly 110. The assembly 110 includes a housing body 111 in which are assembled ball valve parts identical to those disclosed in the valve 51 of FIGS. 1-3. The valve assembly 110 includes a socket weld inlet bore 112 connected to the ball cavity 18 through a passage 116 having portions extending at a right angle to one another. An outlet 117 is formed with a socket weld bore 118 for a pipe. The outlet 117 is connected to the side port of the downstream valve component passage 36. The valve assembly 110 is useful, for example, for exhausting high pressure steam from a boiler.

Figure 8:
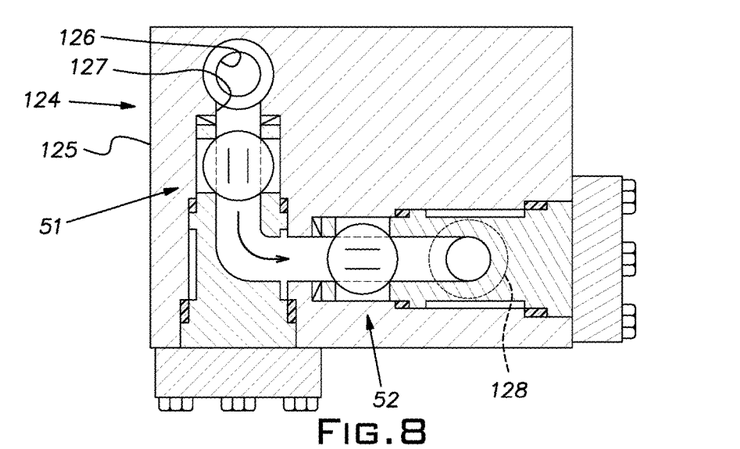
FIG. 8 is a schematic cross-sectional view of a sixth embodiment of the invention taken in a horizontal plane.

FIG. 8 illustrates a tandem valve assembly 124 similar to that of FIGS. 1-3 having a housing 125. Within the housing 125 are a pair of ball valves 51, 52 of a construction identical to that described above. The housing has a vertical inlet 126 of the socket weld design, for connection with a down flowing vertical pipe. The vertical inlet 126 intersects a horizontal bore 127 that is equivalent to the inner end of the bore 57 of the valve 10. The housing 125 has an outlet 128 also preferably of the socket weld design, shown in phantom to indicate that it is located on a lower face of the housing to be connected to a vertical pipe. The valve assembly 124, alternatively, can be inverted so that the inlet 126 is facing downwardly. The valve assembly 125, when installed in vertical pipe lines has its DVC's in a horizontal plane for ease of disassembly and reassembly of valve components.

The valve balls and seat mating surfaces are most commonly a high velocity oxy-fueled hard coating or a spray and fused hard coatings. Some applications can use a resilient seat material like Teflon or PEEK and an uncoated stainless steel ball. The seals associated with the DVC and valve stem packing can be high density graphite rings.

Figure 9:
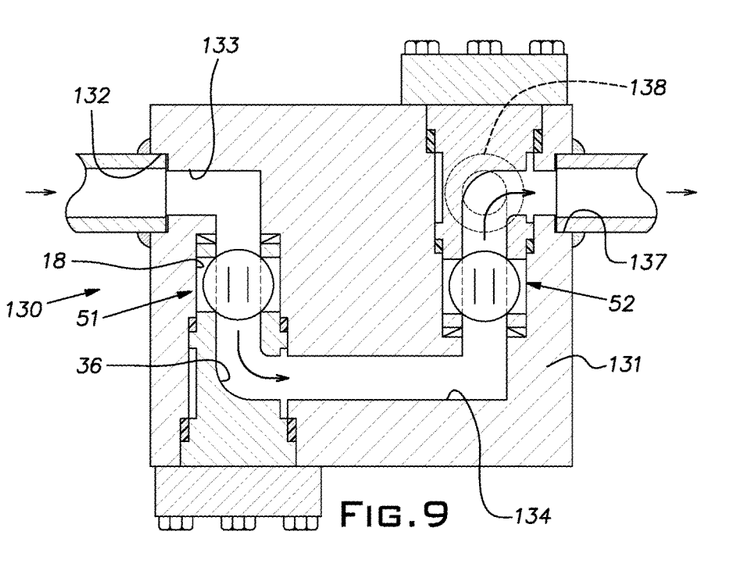
FIG. 9 is a schematic cross-sectional view of a seventh embodiment of the invention.

FIG. 9 illustrates a tandem valve assembly 130 including a housing 131 in which the valves 51, 52 are oriented in opposite directions relative to each other. An inlet 132 in the housing connects with an internal passage 133 that turns the flow direction 90 degrees prior to entry into the ball cavity 18 of the first valve 51. The DVC passage 36 of the first valve 51 communicates with an internal passage 134 which turns the flow direction 90 degrees prior to entry into the second valve 52. The DVC internal passage 36 of the second valve 52 turns flow 90 degrees to an outlet 137. The valve assembly 130 can be used with both vertical and horizontal pipe orientations while the axes of the valves 51, 52 can be horizontal for ease of reassembly. Additionally, it will be understood that the inlet and outlet pipes can be coaxial. Where the outlet is oriented into the plane of the drawing as indicated at 138 and the illustrated outlet 138 is omitted, the valve 130 can serve as an el.

Figure 10:
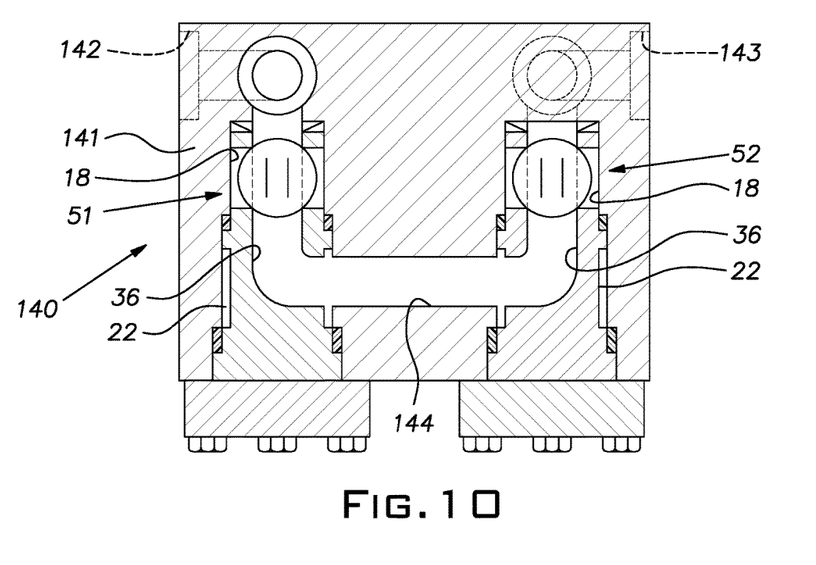
FIG. 10 is a schematic cross-sectional view of an eighth embodiment of the invention.

A bidirectional valve assembly 140 is shown in FIG. 10. A housing 141 receives a pair of valves 51, 52 arranged with their axes parallel and in the same orientation. The ball cavity 18 of each valve 51, 52 is served by a respective port 142, 143. The side ports of the internal passages 36 DVCs 22 are coaxial, oriented towards one another, and connected by an intermediate passage or bore 144. Flow through the assembly 140 can be in either direction with each port 142, 143 serving as an inlet or an outlet. One of the valves 51 or 52 serves as a primary positive shutoff in each flow direction. As suggested in FIG. 10, the ports 142, 143 can have orientations that are perpendicular or parallel to the plane of the drawing.

The valve balls 21 of the valve assemblies 130, 140 are rotationally interlocked with valve stems in the manner disclosed above.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. An industrial valve comprising a monolithic metal housing body having an inlet, an outlet, and a circular bore extending along an axis in the body, the inlet and outlet being configured to be connected to respective pipes, the bore being closed by a cover releasably bolted to the body, a distal portion of the bore forming a valve ball cavity, a valve ball in the cavity having a hole passing through the center of the valve ball, a downstream valve component entirely between the cover and an unseated portion of the valve ball, the downstream valve component having a valve seat engaged with the valve ball, the inlet being connected by a passage in the body to the ball cavity on a side of the valve ball opposite the seat, the downstream valve component having an interior passage connected to an opening through the valve seat and having a side port, a stem extending from the ball valve cavity to the exterior of the body for rotating the valve ball, a second circular bore in the body extending from an outer surface of the body and forming a second valve ball cavity, a cover closing the second bore, a second valve seat at a second cavity inner end, a multiple orifice valve ball in the second cavity, the multiple orifice valve ball having an inlet port on an axis of the multiple orifice valve ball, and multiple outlet orifices distributed circumferentially about said ball axis, a valve stem extending from the second cavity out of the body for rotating the multi-orifice valve ball about said ball axis, the ball inlet port being constantly fluidly connected in all positions of the valve ball to the side port of the downstream valve component and the orifices being selectively connected to an opening through the second valve seat, the opening through the second valve seat being fluidly connected to the outlet.

2. An industrial valve as set forth in claim 1, wherein the multiple outlet orifices are of different sizes.

* * * * *